US012666252B2

(12) United States Patent
Colom Ikuno

(10) Patent No.: US 12,666,252 B2
(45) Date of Patent: Jun. 23, 2026

(54) METHOD FOR QUERYING AND FOR SUBSCRIBING PCF BINDING EVENTS FOR AN ADDRESS RANGE IN A 5G SYSTEM

(71) Applicant: Deutsche Telekom AG, Bonn (DE)

(72) Inventor: Josep Colom Ikuno, Korneuburg (AT)

(73) Assignee: Deutsche Telekom AG, Bonn (DE)

( * ) Notice: Subject to any disclaimer, the term of this patent is extended or adjusted under 35 U.S.C. 154(b) by 293 days.

(21) Appl. No.: 18/451,859

(22) Filed: Aug. 18, 2023

(65) Prior Publication Data

US 2023/0396993 A1      Dec. 7, 2023

Related U.S. Application Data

(62) Division of application No. 17/228,732, filed on Apr. 13, 2021, now Pat. No. 11,736,936.

(30) Foreign Application Priority Data

Apr. 14, 2020      (EP) .................................... 20169334

(51) Int. Cl.
| | |
|---|---|
| *H04W 8/26* | (2009.01) |
| *H04W 8/18* | (2009.01) |
| *H04W 76/11* | (2018.01) |

(52) U.S. Cl.
CPC ............... *H04W 8/26* (2013.01); *H04W 8/18* (2013.01); *H04W 76/11* (2018.02)

(58) Field of Classification Search
CPC .......... H04W 8/26; H04W 76/11; H04W 8/18
USPC ..................................................... 455/435.1
See application file for complete search history.

(56) References Cited

U.S. PATENT DOCUMENTS

| | | | |
|---|---|---|---|
| 12,052,594 B2 * | 7/2024 | Lee ..................... | H04L 65/1016 |
| 2019/0007500 A1 * | 1/2019 | Kim ..................... | H04L 67/141 |
| 2019/0053308 A1 * | 2/2019 | Castellanos Zamora .................... H04L 65/1073 |
| 2019/0158408 A1 | 5/2019 | Li et al. | |
| 2019/0174449 A1 * | 6/2019 | Shan ..................... | H04W 60/04 |
| 2019/0253917 A1 * | 8/2019 | Dao ..................... | H04W 76/27 |
| 2019/0260834 A1 | 8/2019 | Thiebaut et al. | |

(Continued)

OTHER PUBLICATIONS

U.S. Appl. No. 17/228,732, filed Apr. 13, 2021.

(Continued)

*Primary Examiner* — Mark G. Pannell
(74) *Attorney, Agent, or Firm* — Leydig, Voit & Mayer, Ltd.

(57) ABSTRACT

A method for subscribing for Policy Control Function (PCF) binding events for an address range in a 5G system (5GS) includes: subscribing, from the NF Service Consumer to the functional entity, to binding information changes for one or a combination of subscriber parameters; sending, from the functional entity to the NF Service Consumer, a confirmation of the subscription; detecting, by the functional entity, a change of the stored binding information matching one or a combination of the subscriber parameters for one or more subscriber IDs; notifying of the change of the stored binding information, from the functional entity to the subscribed NF Service Consumer, by sending new PDU session binding information associated with the one or more subscriber IDs; and receiving, at the NF Service Consumer, the new PDU session binding information associated with the one or more subscriber IDs.

12 Claims, 9 Drawing Sheets

(56)  References Cited

U.S. PATENT DOCUMENTS

| | | | | |
|---|---|---|---|---|
| 2019/0313236 | A1* | 10/2019 | Lee | H04L 41/0894 |
| 2019/0357301 | A1* | 11/2019 | Li | H04W 40/20 |
| 2019/0364541 | A1* | 11/2019 | Ryu | H04W 80/10 |
| 2019/0394833 | A1* | 12/2019 | Talebi Fard | H04W 60/00 |
| 2020/0053828 | A1* | 2/2020 | Bharatia | H04W 76/11 |
| 2020/0084663 | A1* | 3/2020 | Park | H04W 8/08 |
| 2020/0221541 | A1* | 7/2020 | Yan | H04M 15/66 |
| 2020/0267554 | A1* | 8/2020 | Faccin | H04W 12/06 |
| 2020/0322775 | A1 | 10/2020 | Lee et al. | |
| 2021/0037375 | A1 | 2/2021 | Cakulev et al. | |
| 2021/0058366 | A1 | 2/2021 | Mas Rosique et al. | |
| 2021/0122261 | A1* | 4/2021 | Qiao | H04W 4/40 |
| 2021/0168643 | A1* | 6/2021 | Yao | H04M 15/66 |
| 2021/0250788 | A1* | 8/2021 | Kim | H04W 24/04 |
| 2021/0314820 | A1* | 10/2021 | Schliwa-Bertling | H04L 47/74 |
| 2022/0022101 | A1 | 1/2022 | Wang et al. | |
| 2022/0070702 | A1* | 3/2022 | Puente Pestaña | H04L 43/065 |
| 2022/0151004 | A1* | 5/2022 | Sedlacek | H04W 8/082 |
| 2022/0191052 | A1 | 6/2022 | Garcia Azorero et al. | |
| 2022/0225443 | A1 | 7/2022 | Zhu et al. | |
| 2022/0264503 | A1* | 8/2022 | Starsinic | H04L 63/08 |
| 2022/0272619 | A1* | 8/2022 | Garcia Azorero | H04W 8/186 |
| 2022/0338062 | A1* | 10/2022 | Bennett | H04W 48/06 |
| 2022/0346052 | A1* | 10/2022 | Foti | H04W 60/04 |
| 2023/0037802 | A1* | 2/2023 | Karampatsis | H04W 24/10 |
| 2023/0062452 | A1* | 3/2023 | Kim | H04W 60/00 |
| 2023/0080830 | A1* | 3/2023 | Fernandez Alonso | H04L 12/1407 455/422.1 |
| 2023/0094062 | A1* | 3/2023 | Kim | H04W 8/12 455/456.1 |
| 2023/0362127 | A1* | 11/2023 | Korja | H04L 61/4511 |

OTHER PUBLICATIONS

"3rd Generation Partnership Project; Technical Specification Group Services and System Aspects; System architecture for the 5G System (5GS); Stage 2 (Release 16)", 3GPP Standard TS 23.501, No. V16.4.0, Mar. 27, 2020, XP051861090.

"3rd Generation Partnership Project; Technical Specification Group Services and System Aspects; Policy and charging control framework for the 5G System (5GS); Stage 2 (Release 16)", 3GPP Standard TS 23.503, No. V16.4.1, Apr. 6, 2020, XP051893851.

"3rd Generation Partnership Project; Technical Specification Group Services and System Aspects; Procedures for the 5G System (5GS); Stage 2 (Release 16)", 3GPP Standard TS 23.502, No. V16.4.0, Mar. 27, 2020, XP051861092.

"3rd Generation Partnership Project; Technical Specification Group Core Network and Terminals; 5G System; Binding Support Management Service; Stage 3 (Release 16)", 3GPP TS 29.521, V16.3.0, Mar. 27, 2020, XP051861165.

"3rd Generation Partnership Project; Technical Specification Group Core Network and Terminals; 5G System; Unified Data Management Services; Stage 3 (Release 16)", 3GPP TS 29.503, V16.3.0, Mar. 30, 2020, XP051861232.

"3rd Generation Partnership Project; Technical Specification Group Core Network and Terminals; 5G System; Principles and Guidelines for Services Definition; Stage 3 (Release 16)", 3GPP TS 29.501, V16.3.0, Mar. 30, 2020, XP051861229.

Newton Arin: "Registration Data Access Protocol (RDAP) Query Format; rfc7482.txt", IETF, Mar. 25, 2015, XP015104576.

* cited by examiner

METHOD FOR QUERYING AND FOR SUBSCRIBING PCF BINDING EVENTS FOR AN ADDRESS RANGE IN A 5G SYSTEM

CROSS-REFERENCE TO PRIOR APPLICATIONS

This is a division of U.S. patent application Ser. No. 17/228,732, filed Apr. 13, 2021, which claims priority to European Patent Application No. EP 20169334.8, filed on Apr. 14, 2020, the entire disclosures of both of which applications are hereby incorporated by reference herein.

FIELD

The invention relates to a method for enabling addressing and notification of Protocol Data Unit (PDU) sessions and related Network Functions (NFs) via an address range in a 5G system. In particular, the invention relates to a method for querying and a method for subscribing to Policy Control Function (PCF) bindings events for an address range in a 5G system. The invention also relates to a method for querying and a method for subscribing to information for a Media Access Control (MAC) or Internet Protocol (IP) address range, a Data Network Name (DNN), Subscription Permanent Identifier (SUPI), Generic Public Subscription Identifier (GPSI), and/or a Single Network Slice Selection Identifier (S-NSSAI) in a communications system.

BACKGROUND

One of the promises of the 5G core (5GC) is to enable easy interaction with external entity systems, i.e. third party systems, via exposed Application Program Interfaces (APIs).

The 5GC is comprised by Network Functions (NFs), each of which being a functional entity tasked with a defined set of responsibilities, as defined in 3GPP TS 23.501.

FIG. 1 illustrates part of the 5G system architecture as standardized by 3GPP. In particular, FIG. 1 illustrates some of the Network Functions (NFs) of a 5G Core as defined in TS 23.501 as well as a User Equipment (UE), e.g. a mobile phone or other device, connected to a Radio Access Network (RAN), where the RAN is connected to the User Plane Function (UPF) (part of the 5GC), which allows the UE to have connectivity to a Data Network (DN), e.g. an external data network, such as the Internet.

The 5GC is comprised on Network Functions (NFs), i.e. functional entities, each functional entity tasked with a defined set of responsibilities, as defined in TS 23.501. Some of these functional entities are shown in FIG. 1 such as: the Network Repository Function (NRF), Network Exposure Function (NEF), Policy Control Function (PCF), Unified Data Management (UDM), Binding Support Function (BSF), Network Data Analytics Function (NWDAF), Access and Mobility Management Function (AMF), Session Management Function (SMF), User Plane Function (UPF).

The Network Exposure function (NEF) is tasked, as defined in TS 23.501, 5.20 with supporting external exposure of capabilities of network functions. External exposure can be categorized as monitoring capability, provisioning capability, policy/charging capability and analytics reporting capability As per TS23.503, the Binding Support Function (BSF) is defined as follows. The BSF stores information about the user identity, the Data Network Name (DNN), the User Equipment (UE) (IP or Ethernet) address(es), the Data Network (DN) information (e.g. Single-Network Slice Selection Identifier, S-NSSAI) and the selected Policy Control Function (PCF) address as well as the associated PCF instance ID and PCF set ID if available (clause 6.3.1.0 of TS 23.501) for a certain Protocol Data Unit (PDU) Session. This information is stored internally in the BSF.

The PCF registers, updates and removes the binding information from the BSF using the Nbsf management service operations API exposed by the BSF (TS 23.502). The PCF ensures that it is updated each time an IP address is allocated or de-allocated to the PDU Session or, for Ethernet PDU Sessions supporting binding of an Application Function (AF) request based on a MAC address, each time it has been detected that a MAC address is used or no more used by the UE in the PDU Session.

Based on an operator's policies and configurations, the PCF determines whether the same PCF shall be selected for the SM Policy associations to the same UE ID, S-NSSAI and DNN combination in the non-roaming or home-routed scenario.

As specified in TS 23.502, the NF(s) responsible for a given PDU session is established during the PDU session establishment procedure. The procedure is slightly different for the IP and Ethernet PDU session types.

FIG. 2 illustrates the PDU session establishment procedure of an IP PDU session type and FIG. 3 illustrates the PDU session establishment procedure of an Ethernet PDU session type, as defined in TS 23.502.

In FIG. 2, the SMF establishes a PDU session of IP type, in step S1A, and notifies, in step S2A, the PCF of the IP address (in IPv6 may be multiple addresses) assigned to the PDU session regardless of whether the IP address was allocated by the SMF, an external AAA-S or any other method. In step S3A, the PCF registers the PDU session ID and associated data in the BSF as the PCF responsible for a given PDU session (named PCF Binding information). Finally, in step S4A, the SMF registers the PDU session ID in the Unified Data Management (UDM) as the SMF responsible for this PDU session.

In FIG. 3, the SMF establishes a PDU session of Ethernet type, in step S1B, and registers, in step S2B, the PDU session ID in the UDM as the SMF responsible for this PDU session. MAC addresses are not assigned by the 5GS. Instead, similarly to how an Ethernet switch operates, the 5G System learns the MAC addresses associated to a certain PDU session (analogous to a physical Ethernet port) by observing the source MAC address of incoming Ethernet frames (TS 23.501). In step S3B, the UPF notifies the SMF of any observed changes (e.g. MAC address addition/removal). In step 4B, the SMF notifies the PCF of the MAC address(es) associated with the PDU session and, finally, in step S5B, the PCF updates the PCF Binding information in the BSF with the MAC address(es).

TS 29.521 defines the information stored in the PCF Binding information in the BSF by the PCF. The parameters are listed in table 1 below:

TABLE 1

Excerpt of PcfBinding parameters (M: Mandatory, O: Optional, C: Conditional)

| Attribute | P | Cardinality | Description |
|---|---|---|---|
| SUPI | O | 0 . . . 1 | Subscription Permanent Identifier |
| GPSI | O | 0 . . . 1 | Generic Public Subscription Identifier |
| IPv4 address | C | 0 . . . 1 | The IPv4 Address of the served UE. |
| IP domain | O | 0 . . . 1 | IPv4 address domain identifier. |
| IPv6 prefixes | C | 0 . . . 1 | The IPv6 Address Prefix of the served UE. |
| Additional IPv6 prefixes | O | 1 . . . N | Additional IPv6 Address Prefixes of the served |
| MAC address | C | 0 . . . 1 | The MAC Address of the served UE. |
| Additional MAC | O | 1 . . . N | Additional MAC Addresses of the served UE. |
| DNN | M | 1 | DNN |
| S-NSSAI | M | 1 | The identification of slice. |
| PCF instance ID | O | 0 . . . 1 | PCF instance identifier |

The BSF Application Programming Interface (API) provides a method allowing to retrieve the Session binding information, i.e. PCF address information of a given tuple. An excerpt of the allowed Query parameters is shown in table 2 below.

TABLE 2

Excerpt of query parameters supported by BSF
to query a single PcfBinding resource
(M: Mandatory, O: Optional, C: Conditional)

| Name | P | Cardinality | Description |
|---|---|---|---|
| IPv4 address | C | 0 . . . 1 | The IPv4 Address of the served UE. |
| IPv6 prefix | C | 0 . . . 1 | The IPv6 Address of the served UE. The NF service consumer shall append '/128' to the IPv6 address in the attribute value. |
| MAC Address | C | 0 . . . 1 | The MAC Address of the served UE. |
| DNN | O | 0 . . . 1 | DNN |
| SUPI | O | 0 . . . 1 | Subscription Permanent Identifier |
| GPSI | O | 0 . . . 1 | Generic Public Subscription Identifier |
| S-NSSAI | O | 0 . . . 1 | The identification of slice. |
| IP domain | O | 0 . . . 1 | The IPv4 address domain identifier. |

As per TS 29.503, the SMF registration can be queried if the UE ID is known. The data is accessed by an Uniform Resource Identifier (URI) following the following scheme: /{UE ID}/registrations/smf-registrations. The UE ID represents the Subscription Identifier SUPI or GPSI (TS 23.501 clause 5.9.2), e.g. IMSI, NAI, MSIDSDN. S-NSSAI and DNN may be additionally used.

The registration data the SMF registers for each PDU session contains the following data, as shown in table 3 below, that is the SmfRegistration data (excerpt):

TABLE 3

Excerpt of SmfRegistration data

| Attribute name | P | Cardinality | Description |
|---|---|---|---|
| SMF Instance ID | M | 1 | NF Instance Id of the SMF |
| PDU Session ID | M | 1 | PDU Session ID |
| S-NSSAI | M | 1 | A single Network Slice Selection Assistance Information |
| DNN | C | 0 . . . 1 | Data Network Name; shall be present if emergencyServices is false or absent |
| PLMN ID | M | 1 | Serving node PLMN identity. |

Given a single IP address (the same applies to a single MAC address), a consumer can interact (e.g. request data, subscribe to events) with SMF and PCF responsible with that given IP address, i.e. the NFs that can report on session-related information and policy-related information.

By using the information stored in the BSF (IP address-→subscriber ID, PCF instance ID), UDM (subscriber ID→SMF instance ID), a consumer can find out the NFs responsible for this UE.

FIG. 4 illustrates an exemplary interaction with the SMF and PCF given a known IP address.

In FIG. 4, step S11, an NF Service Consumer queries for PCF Binding information for a given IP address to the BSF. In step S12, the BSF replies with PCF Binding information including UE ID and PCF instance ID. In step S13, the NF Service Consumer queries PDU Session SMF registration for the given UE ID to the UDM, and the UDM replies, in step S14, with SmfRegistration data including PDU session ID and SMF instance ID. At this stage, in step S15, for a given IP address, the SMF and PCF are known to the consumer from the BSF and UDM registration. In step S16, the consumer can then interact with the SMF and PCF (for example, perform requests, subscribe to events, etc.) for the given PDU session.

In more detail, 3GPP TS 29.503 defines that the SmfRegistration information returned by the UDM has an array of SmfRegistration objects. In 3GPP TS 29.521, the PcfBinding information returned by the BSF contains a single PcfBinding object (i.e. not an array). As such, a query to the BSF can only return at maximum a single PcfBinding, i.e. only a single address can be resolved per query.

In some specific and realistic use cases, it can be assumed that an external entity system (such as, for example, a third party system) is not aware of 5G System (5GS) identifiers and, instead, relies solely on IP addresses/MAC addresses to identify users such as, for example, the use of secondary authentication and/or analytics.

With regard to the above mentioned first use case, the 5GS allows secondary authentication to be used. An expected use case of secondary authentication are the 5G private networks provided by an operator. There, an external entity (e.g. Company X) can contract from a Mobile Network Operator (MNO) a network for its private use.

Such a network may contain cells reserved for exclusive use for this external entity's subscribers, deploy different functionality for use of such subscribers (for example, 5G slices, local routing of some data traffic, etc.) and also give authentication control to the third party by using an Authorization and Accounting Server (AAA-S) under the third party's control for secondary authentication.

The IP address allocated to each UE can, in this case, be managed by the AAA-S. The AAA-S authenticates subscribers and assigns IP addresses based on external entity credentials that are independent of the credentials used by the 5GS.

An example of this two-level authentication is a 5GS subscriber authenticating towards the 5GS with its 3GPP credentials (IMSI stored in the SIM) and the 5GS notifying that secondary authentication is required (for example, if there is an agreement with Company X such that Company X authenticates its subscribers itself). The secondary authentication is then based on separate credentials (for example, the subscriber identifies itself as a user@company-x.com).

FIG. 5 illustrates an exemplary two-level authentication in a 5G communications system. The system comprises a User Equipment (UE) 1, a 5GS 2, a Data Network (DN) 3 (e.g. the Internet), and an external entity AAA server 4 (AAA-S). In FIG. 5, the key symbols symbolize credentials. The UE 1 has 3GPP credentials to access the 5GS (e.g. SIM card), where such access is denoted with a solid line. In addition, the UE 1 also has additional credentials for authentication towards the external entity AAA server. The 5GS performs not only authentication based on the 5GS credentials, but also forwards authentication messages between the UE and the external AAA server. This indirect interaction between UE and external AAA server via the 5GS is denoted with a dotted line. In this configuration, the 5GS authenticates based on the 3GPP credentials, whereas the external entity AAA server authenticates based on credentials different than 5GS. In addition, IP allocation may be also performed by the AAA-S.

The 5GS forwards authentication messages between the UE and the external entity AAA-S and the AAA-S performs the authentication based on the credentials provided by the subscriber.

From the perspective of the entity operating the AAA-S, users are identified by its credentials and their assigned IP address. In case of Ethernet traffic, as specified in TS23.501, the MAC addresses are given by the subscriber (the device's MAC address or the MAC addresses attached to the device), and the AAA-S can also specify a list of source MAC addresses that are allowed for a given PDU session. As such, MAC addresses are also linked to an authorized credential.

Therefore, in view of the above, the case arises where the external entity managing the address space of 5GS subscribers does not use 5GS identifiers (IMSI, GPSI).

With regard to the above mentioned second use case, the 5GS allows the use of analytics. The Network Data Analytics Function (NWDAF) NF is tasked with (as defined in TS 23.501): support data collection from NFs and AFs; support data collection from Operations, Administration and Maintenance (OAM); NWDAF service registration and metadata exposure to NFs/AFs; support analytics information provisioning to NFs, AFs.

SUMMARY

In an exemplary embodiment, the present invention provides a method for subscribing for Policy Control Function (PCF) binding events for an address range in a 5G system (5GS), wherein the 5GS comprises a Network Function (NF) Service Consumer and a functional entity, wherein the functional entity comprises binding information stored therein and the binding information comprises: Protocol Data Unit (PDU) sessions information and a list comprising one or more subscribers identities (IDs) and/or PCF instance IDs, the method comprising: subscribing, from the NF Service Consumer to the functional entity, to binding information changes for one or a combination of subscriber parameters, wherein the subscriber parameters comprise: a MAC or IP address range, a Data Network Name (DNN), a Subscription Permanent Identifier (SUPI), a Generic Public Subscription Identifier (GPSI), a Single Network Slice Selection Identifier (S-NSSAI), and/or an IP domain; sending, from the functional entity to the NF Service Consumer, a confirmation of the subscription; detecting, by the functional entity, a change of the stored binding information matching one or a combination of the subscriber parameters for one or more of the subscriber IDs; notifying of the change of the stored binding information, from the functional entity to the subscribed NF Service Consumer, by sending new PDU session binding information associated with the one or more subscriber IDs; and receiving, at the NF Service Consumer, the new PDU session binding information associated with the one or more subscriber IDs.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
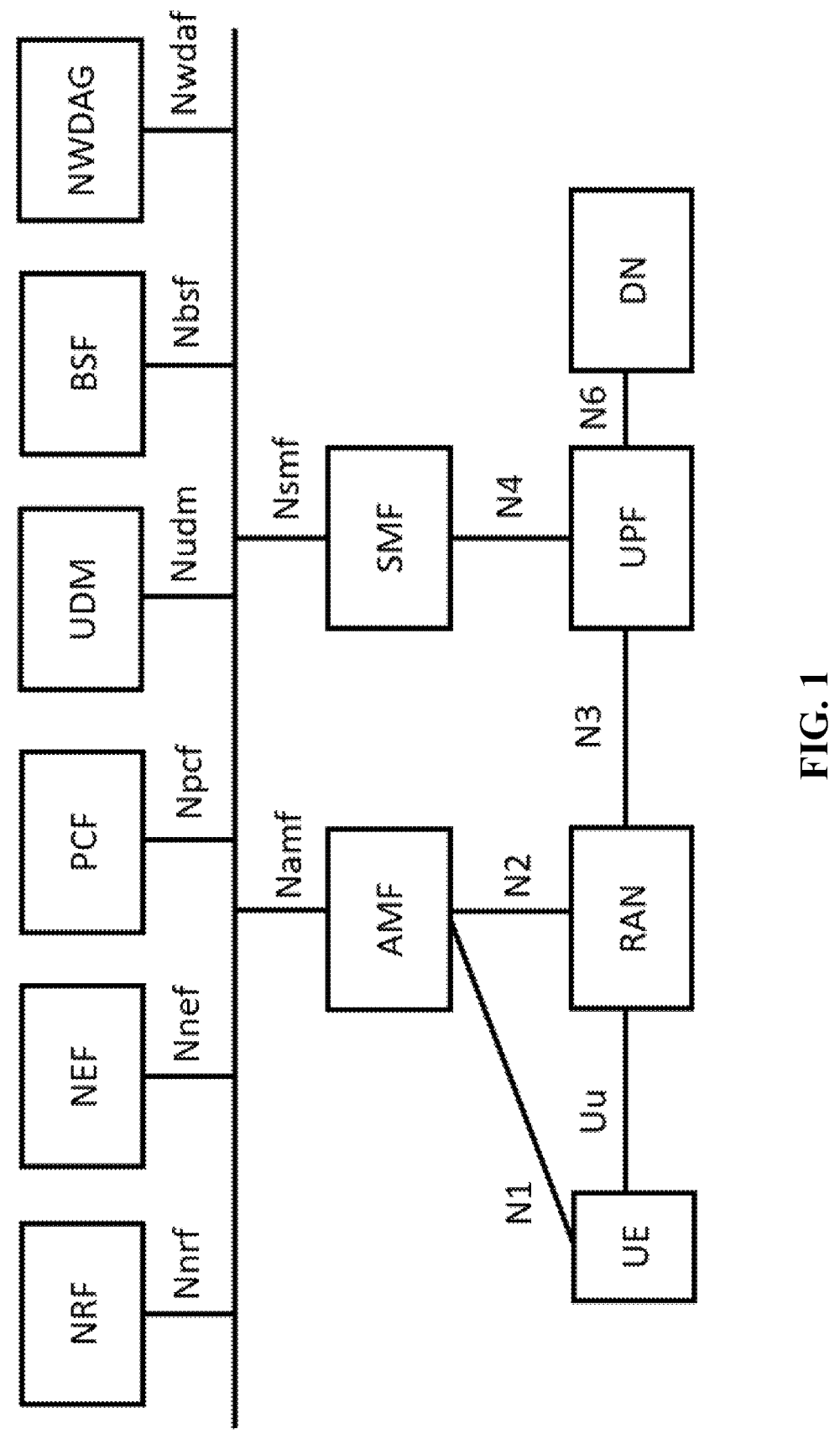
FIG. 1 illustrates Network Functions (NFs) of a 5GC as defined in TS 23.501.
Figure 2:
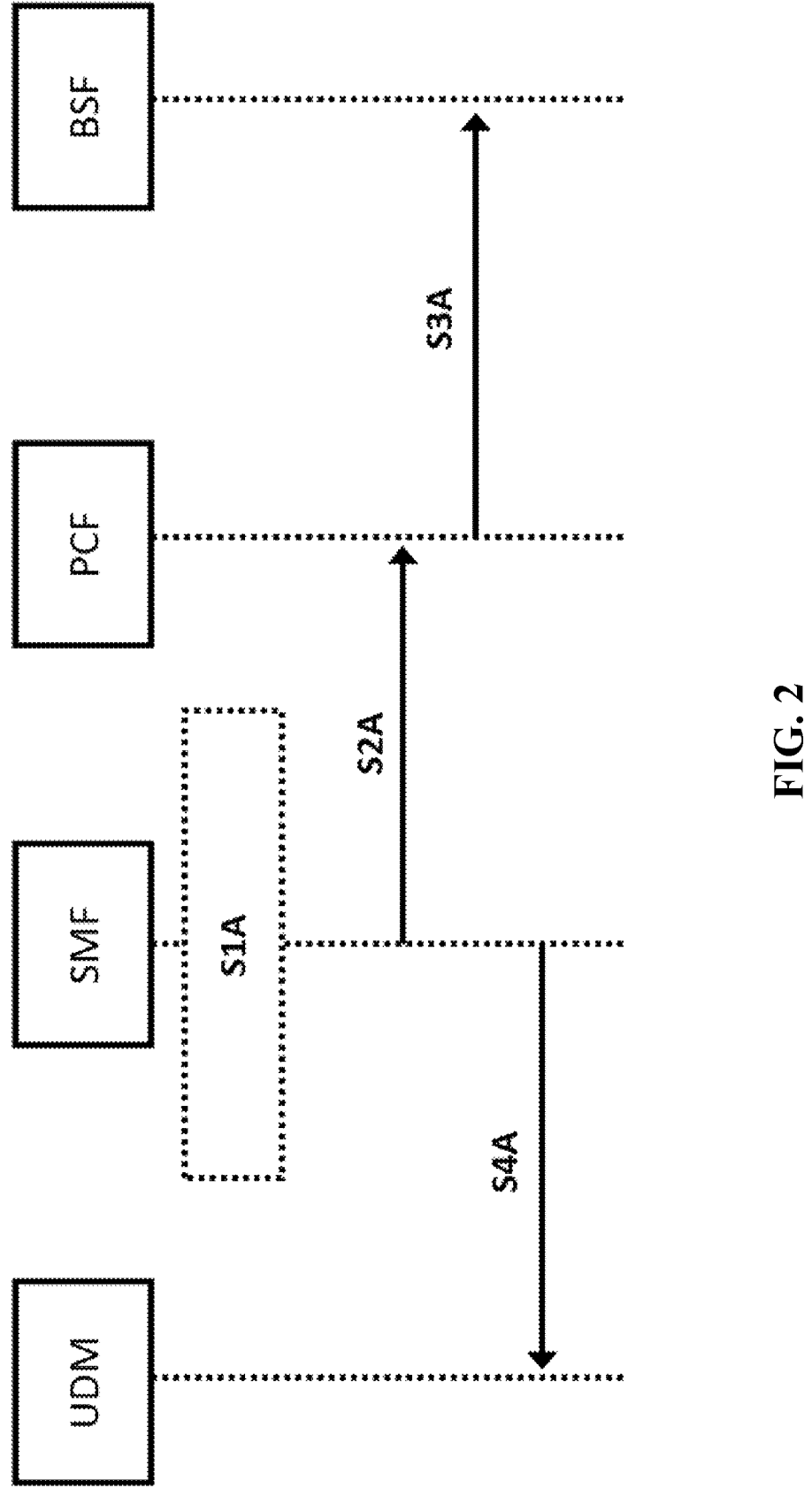
FIG. 2 illustrates a flow for a PDU session establishment procedure of IP type as defined in TS 23.502.
Figure 3:
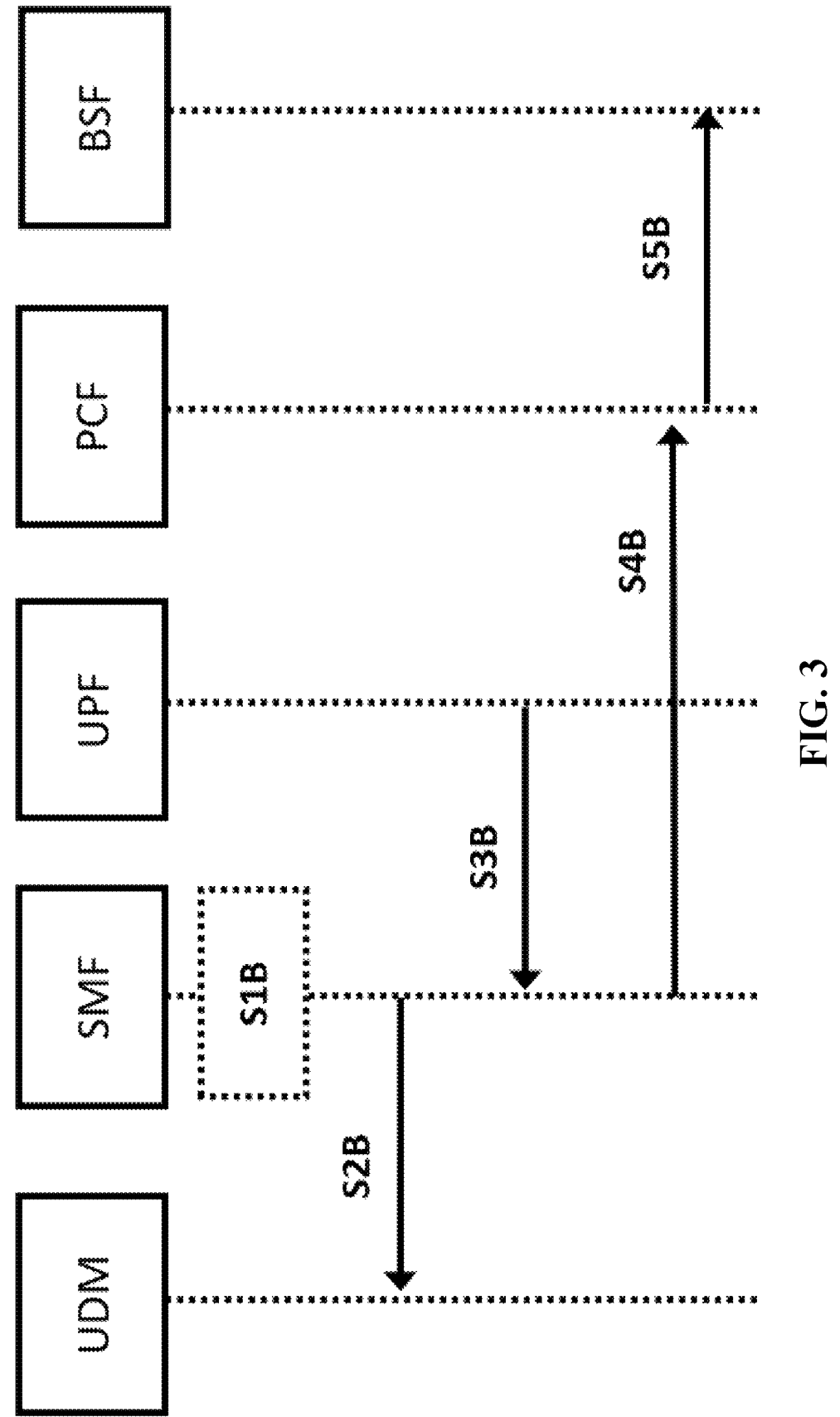
FIG. 3 illustrates a flow for a PDU session establishment procedure of Ethernet type as defined in TS 23.502.
Figure 4:
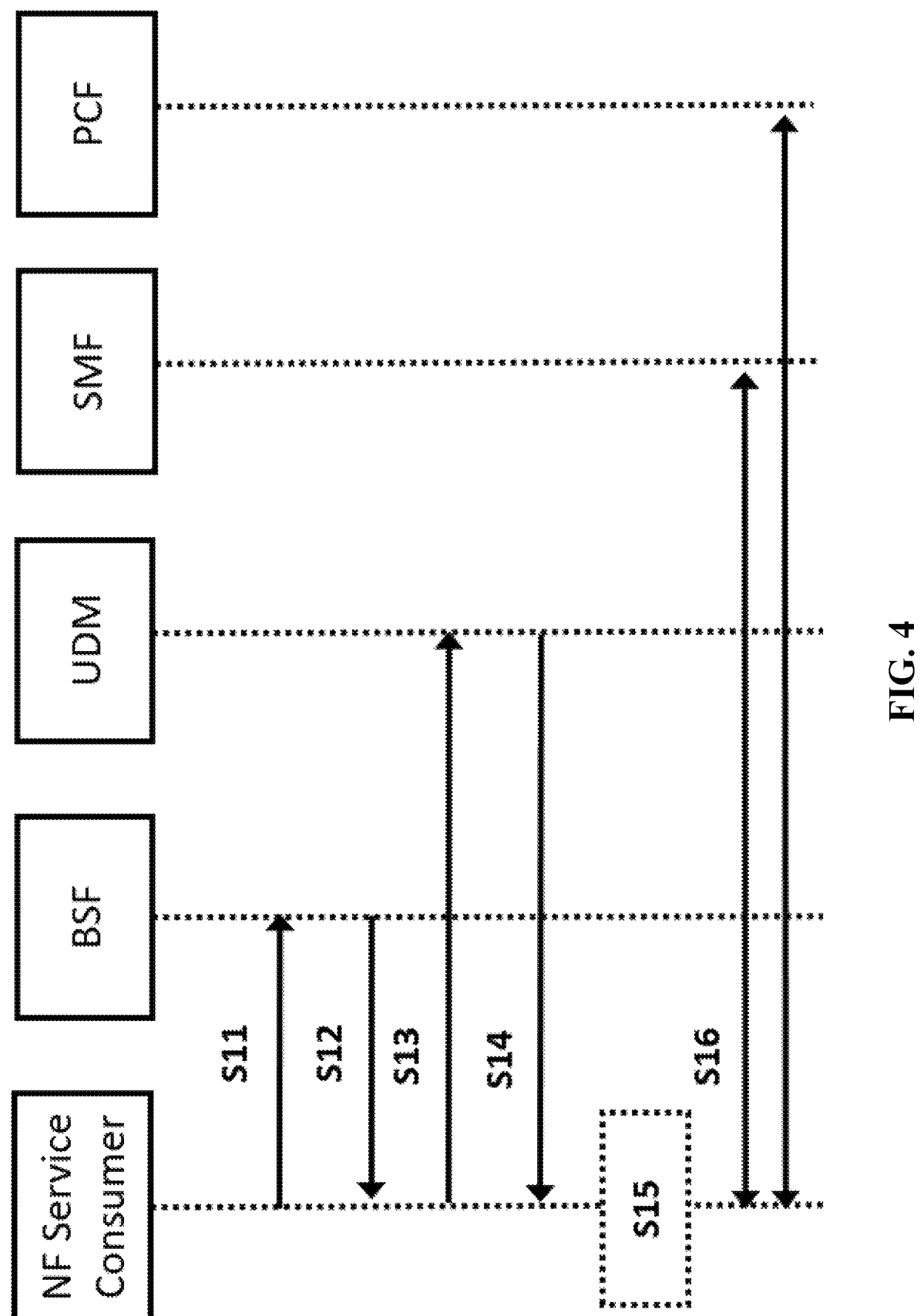
FIG. 4 illustrates a flow of an exemplary interaction with the SMF and PCF given a known IP address.
Figure 5:
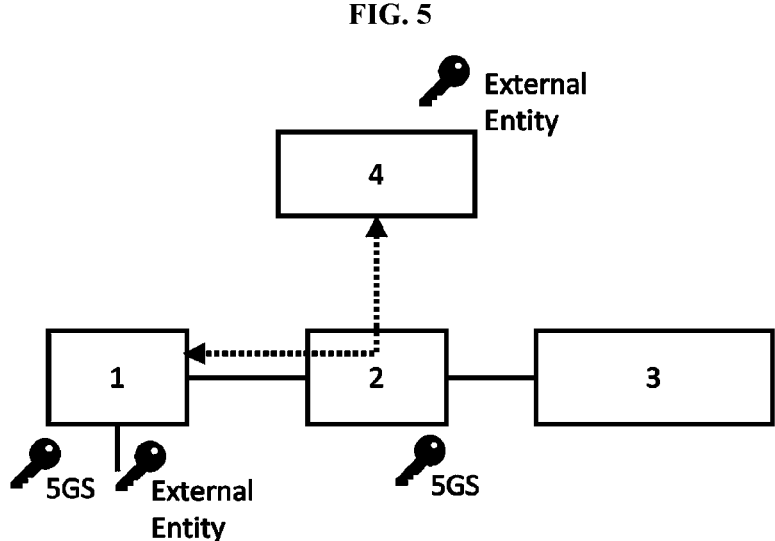
FIG. 5 illustrates an exemplary two-level authentication in a 5GS.

Conventionally, given an IP address range or MAC address range, there is no way to obtain from the 5G system a list of subscribers and no way to query which Network Functions (NFs) are responsible for these subscribers. Instead, it is only possible to query individual addresses.

As an example, given an IP address range 10.0.0.0/16, querying every individual address would require 65,536 queries. Subscribing to events/changes for found users would also require a subscription for each individual subscriber. In this case, an external entity would interact with the 5G system via the Network Exposure Function (NEF). The NEF is tasked, as defined in TS 23.501, 5.20 with supporting external exposure of capabilities of network functions. External exposure can be categorized as monitoring capability, provisioning capability, policy/charging capability and analytics reporting capability.

However, given the above status limitations, use of an IP range or MAC address range to trigger action within the 5G system is not realizable and very inefficient.

Thus, it is conventionally not possible to map an IP range or MAC address range to a group of subscribers (Subscription Permanent Identifier (SUPI) or Generic Public Subscription Identifier (GPSI)).

Further, with regard to analytics, in order to monitor events (for example, policy-related events from a PCF or session-related events from an SMF) for a given IP pool, MAC address range, DNN or slice, conventionally it is necessary for the Binding Support Function (BSF) to locate the PDU session that needs to be monitored. Afterwards, it is conventionally necessary to subscribe at the correct NF responsible for the given PDU session(s).

However, this is conventionally not possible without a brute-force scan of an address range (IP/MAC address range case) or conventionally not possible at all for the other cases.

Conventionally, the following use cases cannot or can only very difficultly be fulfilled.

For example, if a NF Service consumer possesses only an IP range, e.g. 10.0.0.0/16 (e.g. IP range managed by the AAA-S, range to monitor), optionally a given DNN or slice ID (S-NSSAI) and requires to:

1) Query the NFs responsible for PDU sessions (e.g. SMF, PCF) for information. This would require for a /16 IPv4 address range more than 65,000 requests to the BSF. Exponentially increasing the bigger the CIDR range.

2) Query the BSF for bindings if there is more than one expected result.

3) Query the BSF for a full S-NSSAI or DNN (equivalent to 0.0.0.0 IP, i.e. "any IP") unless the whole IP range in queried (232 in the case of IPv4).

4) Keep updated on all events (e.g. SMF and PCF) regarding a given address range (e.g. PDU session establishment, PDU session release, added/removed MAC address for a given PDU session). This would require frequent re-query of 1) and re-evaluation of the returned results. There is current solution to subscribe on the BSF to events (e.g. new binding, binding removed) for a given address range, DNN or S-NSSAI.

In view of the above, exemplary embodiments of the present invention provide a method that provides functionality so that a 5G system can: given an address range (IP or MAC address), obtain the subscribers with addresses within that range; subscribe to changes/events within these ranges (for example, what Policy Control Functions (PCFs) are responsible for the subscribers in a given range; and enable addressing and notification of PDU sessions and related NFs via an address range in a 5GS.

According to a first aspect, the invention provides a method for querying Policy Control Function (PCF) binding information for an address range in a 5G system (5GS), wherein the 5GS comprises a Network Function (NF) Service Consumer, and a functional entity, wherein the functional entity comprises binding information stored therein and the binding information comprises: Protocol Data Unit (PDU) sessions information and a list comprising one or more subscribers identities (IDs) and/or PCF instance IDs, the method comprising the steps of: querying, from the NF Service Consumer to the functional entity, based on one or a combination of query parameters, for all binding information matching the query parameters; and notifying, from the functional entity to the NF Service Consumer, any binding information that matches the query parameters, wherein the query parameters comprise: a MAC or IP address range, a Data Network Name (DNN), Subscription Permanent Identifier (SUPI), Generic Public Subscription Identifier (GPSI), a Single Network Slice Selection Identifier (S-NSSAI), and/or IP domain.

According to a further aspect, the 5GS further comprises a Unified data management (UDM), a Session Management Function (SMF), and a Policy Control Function (PCF), the method further comprising the steps of: receiving, at the NF Service Consumer, the binding information, matching the query parameters, comprising list of subscriber IDs; querying, from the NF Service Consumer to the UDM, for SMF registration data based on the list of subscriber IDs, replying, from the UDM to the NF Service Consumer, to the above query, with SMF registration data matching the list of subscriber IDs, wherein the SMF registration data comprises one or more PDU session IDs and/or SMF instance IDs; receiving, at the NF Service Consumer, the SMF registration data; and interacting, from the NF Service Consumer with the SMF and/or the PCF, using the one or more PDU session IDs and/or SMF instance IDs.

According to a second aspect, the invention provides a method for querying information for a MAC or IP address range, a Data Network Name (DNN), a Subscription Permanent Identifier (SUPI), a Generic Public Subscription Identifier (GPSI), a Single Network Slice Selection Identifier (S-NSSAI), and/or IP domain, in a communication system, wherein the system comprises: an external entity, and a 5G system (5GS), comprising a Network Function (NF) Service Consumer, the method comprising the steps of: querying, from the external entity to the NF Service Consumer, for information matching one or more of a combination of query parameters, wherein the query parameters comprise: MAC or IP address range, DNN, SUPI, GPSI, S-NSSAI and/or IP domain; performing, at the NF Service Consumer and the 5GS, a method according to any of the above aspects; and notifying, from the NF Service Consumer to the external entity, of the information matching the query parameters.

According to a third aspect, the invention provides a method for subscribing for Policy Control Function (PCF) binding events for an address range in a 5G system (5GS), wherein the 5GS, comprises a Network Function (NF) Service Consumer, a functional entity, wherein the functional entity comprises binding information stored therein and the binding information comprises: Protocol Data Unit (PDU) sessions information and a list comprising one or more subscribers identities (IDs) and/or PCF instance IDs, the method comprising the steps of: subscribing, from the NF Service Consumer to the functional entity, to binding information changes for one or a combination of subscriber parameters, wherein the subscriber parameters comprise: a MAC or IP address range, a Data Network Name (DNN), a Subscription Permanent Identifier (SUPI), a Generic Public Subscription Identifier (GPSI), a Single Network Slice Selection Identifier (S-NSSAI), and/or IP domain; sending, from the functional entity to the NF Service Consumer, a confirmation of the subscription of the previous step; detecting, by the functional entity, a change of the stored binding information matching one or a combination of the subscriber parameters for one or more of the subscriber IDs; notifying of the change of the stored binding information, from the functional entity to the subscribed NF Service Consumer, by sending new PDU session binding information associated with the one or more subscriber IDs; and receiving, at the NF Service Consumer, the new PDU session binding information associated with the one or more subscriber IDs.

According to a further aspect, the 5GS further comprises a Unified data management (UDM), a Session Management Function (SMF), and a Policy Control Function (PCF), the method further comprises the steps of: querying, from the NF Service Consumer to the UDM, for SMF registration data based on the one or more subscriber IDs associated with the new PDU session binding information; replying, from the UDM to the NF Service Consumer, to the above query, with SMF registration data matching the one or more subscriber IDs, wherein the SMF registration data comprises one or more PDU session IDs and/or SMF instance IDs; updating, at the NF Service Consumer, the SMF registration data; and interacting, from the NF Service Consumer to the SMF and/or the PCF, using the one or more PDU session IDs and/or SMF instance IDs.

According to a fourth aspect, the invention provides a method for subscribing to events for a MAC or IP address range, a Data Network Name (DNN), Subscription Permanent Identifier (SUPI), Generic Public Subscription Identifier (GPSI), a Single Network Slice Selection Identifier (S-NSSAI), and/or IP domain, in a communications system, wherein the system comprises: an external entity, and a 5G system (5GS), comprising a Network Function (NF) Service Consumer, the method comprising the steps of: subscribing, from the external entity to the NF Service Consumer, to event changes for information matching one or a combination of subscriber parameters, wherein the query parameters comprise: the MAC or IP address range, DNN, SUPI, GPSI, S-NSSAI, and/or IP domain; performing, at the NF Service Consumer and the 5GS, the method according to the second or previous aspect; notifying, from the 5G system to the NF Service Consumer, of any event changes for the one or combination of the subscriber parameters; and notifying, from the NF Service Consumer to the subscribed external entity, of the event changes for the one or combination of the subscriber parameters.

According to a further aspect, the functional entity is a Binding Support Function (BSF).

According to a further aspect, the NF Service Consumer is a Network Exposure Function (NEF) or a Network Data Analytics Function (NWDAF).

According to a fifth aspect, the invention provides a 5G system (5GS) configured to allow queries of Policy Control Function (PCF) binding information for an address range, the 5GS comprising a Network Function (NF) Service Consumer, and a functional entity, wherein the functional entity comprises binding information stored therein and the binding information comprises: Protocol Data Unit (PDU) sessions information and a list comprising one or more subscribers identities (IDs) and/or PCF instance IDs, wherein: the NF Service Consumer is configured to query the functional entity, based on one or a combination of query parameters, for all binding information matching the query parameters; and the functional entity is configured to notify to the NF Service Consumer, any binding information that matches the query parameters, wherein the query parameters comprise: a MAC or IP address range, a Data Network Name (DNN), Subscription Permanent Identifier (SUPI), Generic Public Subscription Identifier (GPSI), a Single Network Slice Selection Identifier (S-NSSAI), and/or IP domain According to a further aspect, the 5GS further comprises a Unified data management (UDM), a Session Management Function (SMF), and a Policy Control Function (PCF), wherein: the NF Service Consumer is configured to receive the binding information, match the query parameters, comprising the list of subscriber IDs; the NF Service Consumer is configured to query to the UDM, for SMF registration data based on the list of subscriber IDs, the UDM is configured to reply to the NF Service Consumer, to the above query, with SMF registration data matching the list of subscriber IDs, wherein the SMF registration data comprises one or more PDU session IDs and/or SMF instance IDs; the NF Service Consumer is configured to receive the SMF registration data; and the NF Service Consumer is configured to interact with the SMF and/or the PCF, by using the one or more PDU session IDs and/or SMF instance IDs.

According to a sixth aspect, the invention provides a communication system, wherein the system comprises an external entity and a 5G system (5GS), comprising a Network Function (NF) Service Consumer, wherein: the external entity is configured to query the NF Service Consumer, for information matching one or more of a combination of query parameters, wherein the query parameters comprise: a MAC or IP address range, a Data Network Name (DNN), a Subscription Permanent Identifier (SUPI), a Generic Public Subscription Identifier (GPSI), a Single Network Slice Selection Identifier (S-NSSAI), and/or IP domain; the 5GS and the NF Service Consumer are configured as defined in the fifth aspect or the previous aspect; and the NF Service Consumer is configured to notify to the external entity, of the information matching the query parameters.

According to a seventh aspect, the invention provides a 5G system (5GS), configured to allow subscription to Policy Control Function (PCF) binding events for an address range, wherein the 5GS comprises a Network Function (NF) Service Consumer, a functional entity, wherein the functional entity comprises binding information stored therein and the binding information comprises: Protocol Data Unit (PDU) sessions information and a list comprising one or more subscribers identities (IDs) and/or PCF instance IDs, wherein: the NF Service Consumer is configured to subscribe to the functional entity, to binding information changes for one or a combination of subscriber parameters, wherein the subscriber parameters comprise: a MAC or IP address range, a Data Network Name (DNN), a Subscription Permanent Identifier (SUPI), a Generic Public Subscription Identifier (GPSI), a Single Network Slice Selection Identifier (S-NSSAI), and/or IP domain; the functional entity is configured to send to the NF Service Consumer, a confirmation of the subscription; the functional entity is configured to detect a change of the stored binding information matching one or a combination of the subscriber parameters for one or more of the subscriber IDs; the functional entity is configured to notify of the change of the stored binding information to the subscribed NF Service Consumer, by sending new PDU session binding information associated with the one or more subscriber IDs; and the NF Service Consumer is configured to receive the new PDU session binding information associated with the one or more subscriber IDs.

According to a further aspect, the 5GS further comprises a Unified data management (UDM), a Session Management Function (SMF), and a Policy Control Function (PCF), wherein: the NF Service Consumer is configured to query to the UDM for SMF registration data based on the one or more subscriber IDs associated with the new PDU session binding information; the UDM is configured to reply to the NF Service Consumer, to the above query, with SMF registration data matching the one or more subscriber IDs, wherein the SMF registration data comprises one or more PDU session IDs and/or SMF instance IDs; the NF Service Consumer is configured to update the SMF registration data; and the NF Service Consumer is configured to interact with the SMF and/or the PCF, using the one or more PDU session IDs and/or SMF instance IDs.

According to an eighth aspect, the invention provides a communication system, wherein the system comprises an external entity and a 5G system (5GS), comprising a Network Function (NF) Service Consumer, wherein: the external entity is configured to subscribe to the NF Service Consumer, to event changes for information matching one or a combination of subscriber parameters, wherein the query parameters comprise: a MAC or IP address range, a Data Network Name (DNN), a Subscription Permanent Identifier (SUPI), a Generic Public Subscription Identifier (GPSI), a Single Network Slice Selection Identifier (S-NSSAI), and/or IP domain; the 5GS and the NF Service Consumer are configured as defined in the seventh or previous aspect; the 5GS is configured to notify to the NF Service Consumer, of any event changes for the one or combination of the subscriber parameters; and the NF Service Consumer is configured to notify to the subscribed external entity, of the event changes for the one or combination of the subscriber parameters.

According to a further aspect, the 5GS of any of the previous aspects and the communication system any of the previous aspects, the functional entity is a Binding Support Function (BSF).

According to a further aspect, the 5GS of any of the previous aspects and the communication system any of the previous aspects, the NF Service Consumer is a Network Exposure Function (NEF) or a Network Data Analytics Function (NWDAF).

Other aspects, features, and advantages will be apparent from the summary above, as well as from the description that follows, including the figures and the claims.

According to a further embodiment, the invention provides a method for querying Policy Control Function (PCF) bindings information for an address range in a 5G system (thus, enabling the use of secondary authentication and/or analytics). This method is illustrated in FIG. 6 and describes the interaction between the NF Service Consumer and a functional entity such as, for example, a BSF, to obtain a UE ID and PCF instance ID, upon a query based on: an address range (IP or MAC), DNN, SUPI, GPSI, S-NSSAI, and/or IP domain.

Figure 6:
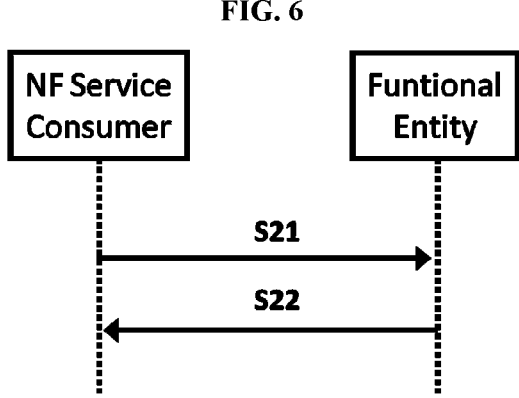
FIG. 6 illustrates a flow of a BSF query for an address range according to an embodiment of the invention.

In FIG. 6, given an address range, DNN, SUPI, GPSI, S-NSSAI, or IP domain of interest where the subscriber identities or PDU Session IDs are not known, a NF Service Consumer (e.g. NEF, NWDAF) queries, in step S21, the functional entity for all known binding information matching one or a combination of the following query parameters: address range (IP, MAC), DNN, SUPI, GPSI, S-NSSAI, and IP domain.

In step S22, the functional entity replies to the NF Service Consumer with the binding information known to it matching the query parameters. The binding information may comprise, for example, a list comprising one or more subscriber identities, IDs, and/or a PCF instance ID.

Also, according to a further embodiment, in order that a given consumer can be notified whenever there is a binding change (e.g. when a PDU session is added/removed), the invention provides a method for subscribing into PCF Binding events for a given address range (IP, MAC), DNN, SUPI, GPSI, S-NSSAI, and/or IP domain. This method is illustrated in FIG. 7 and comprises the following steps.

Figure 7:
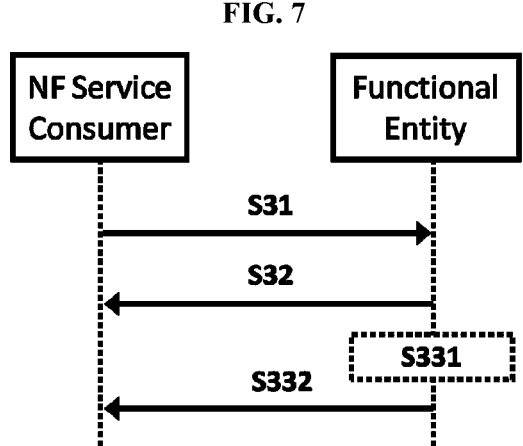
FIG. 7 illustrates a flow of a BSF subscription for a binding change in address range according to an embodiment of the invention.

In FIG. 7, given an address range, DNN, SUPI, GPSI, S-NSSAI, or IP domain of interest where the subscriber identities, IDS, or PDU Session IDs are not known, a NF Service Consumer (e.g. NEF, NWDAF) subscribes, in step S31, on the functional entity to binding changes for one or a combination of the following query parameters: address range (IP, MAC), DNN, SUPI, GPSI, S-NSSAI, and IP domain.

In step S32, the functional entity confirms the subscription, i.e. returns the subscriber status.

In step S331, there is a change in the bindings stored in the functional entity matching the parameters of step S31, e.g. a new PDU session binding is or was registered or removed by a PCF for the given IP or MAC address range for one or more subscriber IDs, the functional entity notifies the subscribed NF Service Consumer, in step S332, with the event information, namely including the information on the new PDU session binding or removed PDU session binding.

Figure 8:
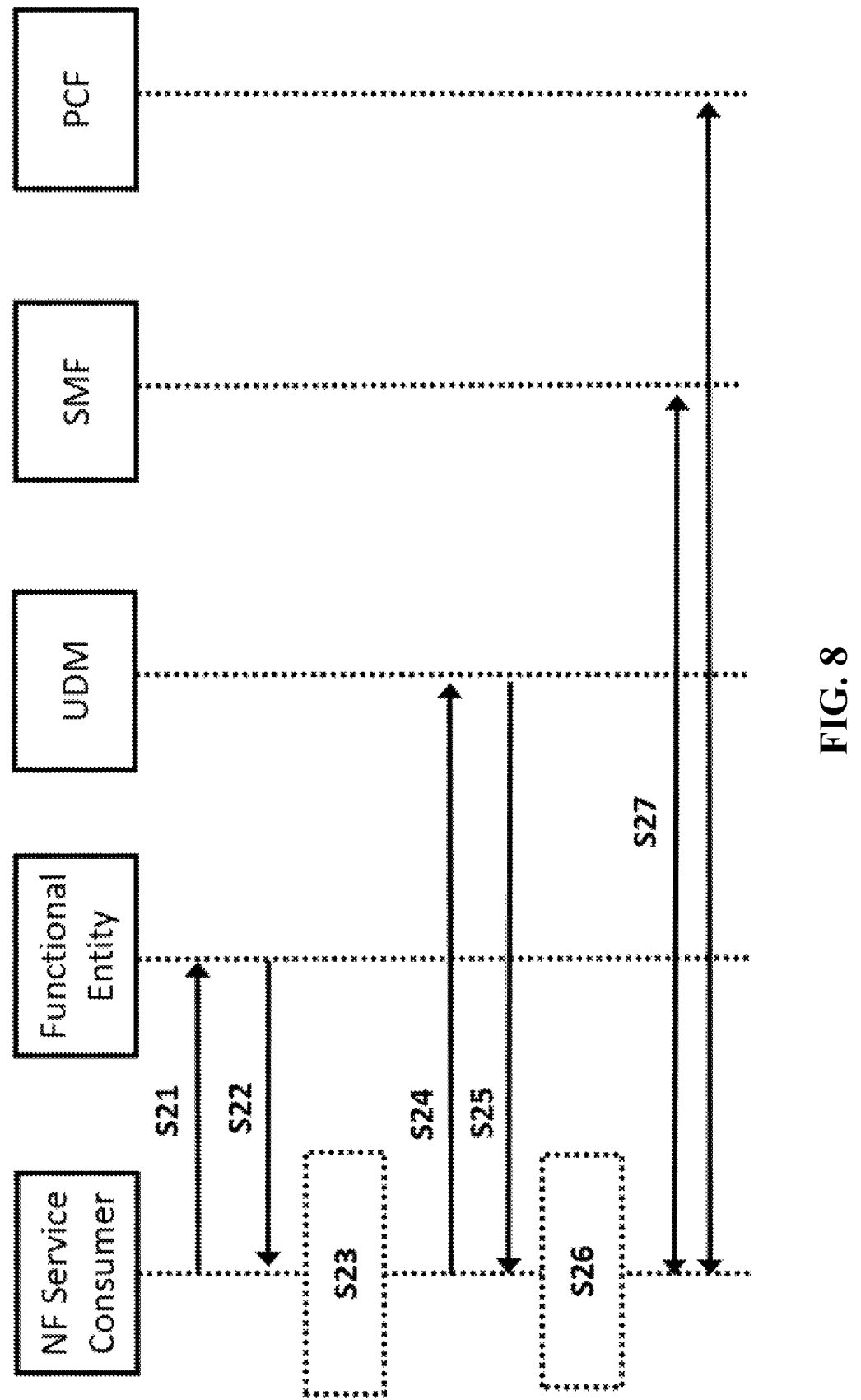
FIG. 8 illustrates a flow for addressing NFs based on a subscriber address range according to an embodiment of the invention.
Figure 9:
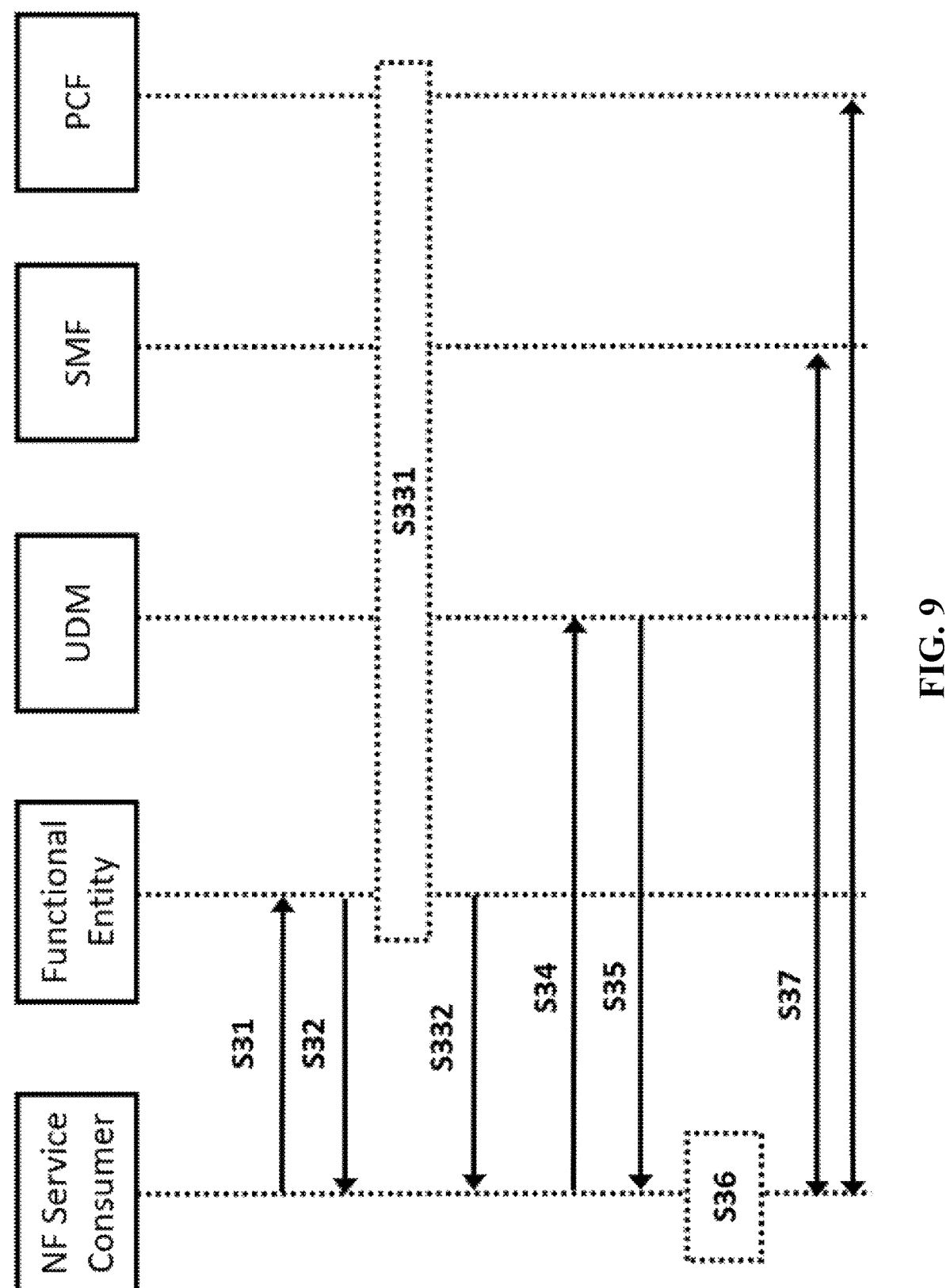
FIG. 9 illustrates a flow for notification of changes based on a subscriber address range according to an embodiment of the invention.

The application of the above methods give rise to two exemplary embodiments as shown in FIGS. 8 and 9, respectively.

In particular, FIG. 8 illustrates a flow for addressing NFs based on a subscriber address range according to an exemplary embodiment of the invention. FIG. 9 illustrates a flow for notification of changes based on a subscriber address range according to an embodiment of the invention.

In FIG. 8, given an address range, DNN, SUPI, GPSI, S-NSSAI, or IP domain of interest where the subscriber identities or PDU Session IDs are not known, the NF Service Consumer and functional entity first perform the same steps as described above for the method of FIG. 6 (steps S21 and S22).

In step S23, the NF Service Consumer has received a list of subscriber IDs. Now, the NF Service Consumer has a list of current subscribers matching the address range.

In step S24, the NF Service Consumer queries to the UDM for SMF registration data, wherein the SMF registration data comprise a PDU session ID and a SMF instance ID for the given subscriber IDs.

In step S25, the UDM replies to the above query with data including PDU session ID and SMF instance ID.

In step S26, the NF Service Consumer receives the data of step S25. Thus, the NF Service Consumer has a list linking the responsible/associated SMFs and/or PCFs for a given address range.

In step S27, the NF Service Consumer can now interact with NFs (e.g. with the SMF and/or PCF) responsible for the mapped PDU sessions. For example, the NF Service Consumer may request and/or subscribe to events for a given PDU session.

In FIG. 9, given an address range, DNN, SUPI, GPSI, S-NSSAI, or IP domain of interest where the subscriber identities (IDs) or PDU Session IDs are not known, the NF Service Consumer and functional entity first perform the same steps as described above for the method of FIG. 7 (steps S31, S32, S331 and S332). Thus, the NF Service Consumer receives information of a new PDU session binding associated with one or more subscriber IDs or of the removal of a PDU session binding associated with one or more subscriber IDs.

If the information received is that of removal of a PDU session binding, steps S34, S35, S36 may be skipped.

In step S34, the NF Service Consumer queries to the UDM for the SMF registration data, e.g. PDU session ID and SMF instance ID for the given subscriber IDs.

In step S35, the UDM replies to the above query with data including PDU session ID and SMF instance ID for the given subscriber IDs.

In step S36, the NF Service Consumer has received the data of step S35. Thus, the NF Service Consumer knows the responsible SMF and PCF for a given address range. In the case of a new PDU session the list may include entries included in step S35 while in the case of removed PDU sessions, entries may be removed from the list. The new subscriber ID or IDs and PDU session/s information is now known to the NF Service Consumer.

In step S37, the NF Service Consumer can now interact with NFs (e.g. with the SMF and/or PCF) responsible for the mapped PDU sessions. For example, the NF Service Consumer may request and/or subscribe to events for a given PDU session or unsubscribe to notifications in the case no PDU session in that NF is required to be tracked.

Figure 10:
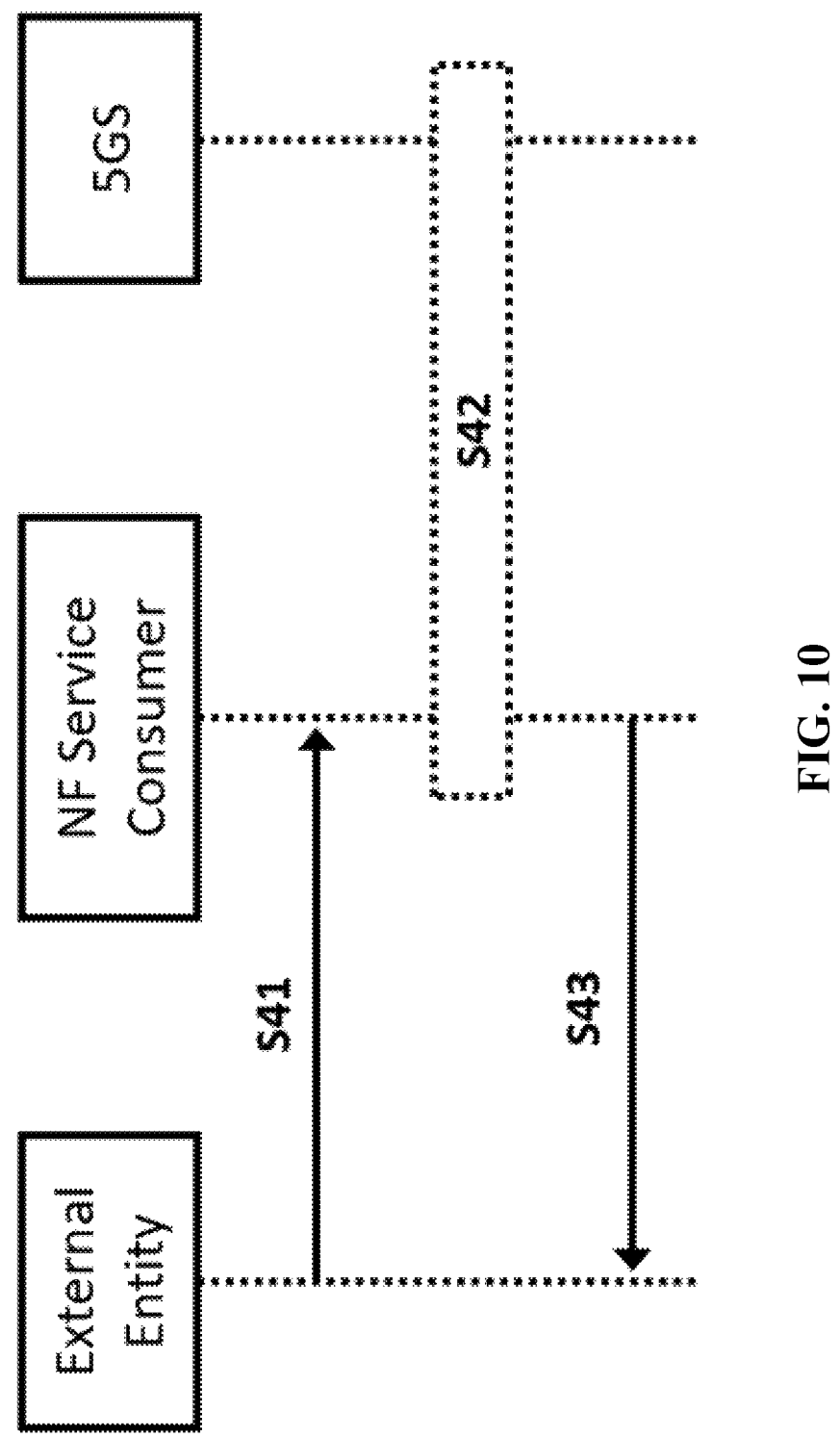
FIG. 10 illustrates a flow for application of information retrieval according to an embodiment of the invention.
Figure 11:
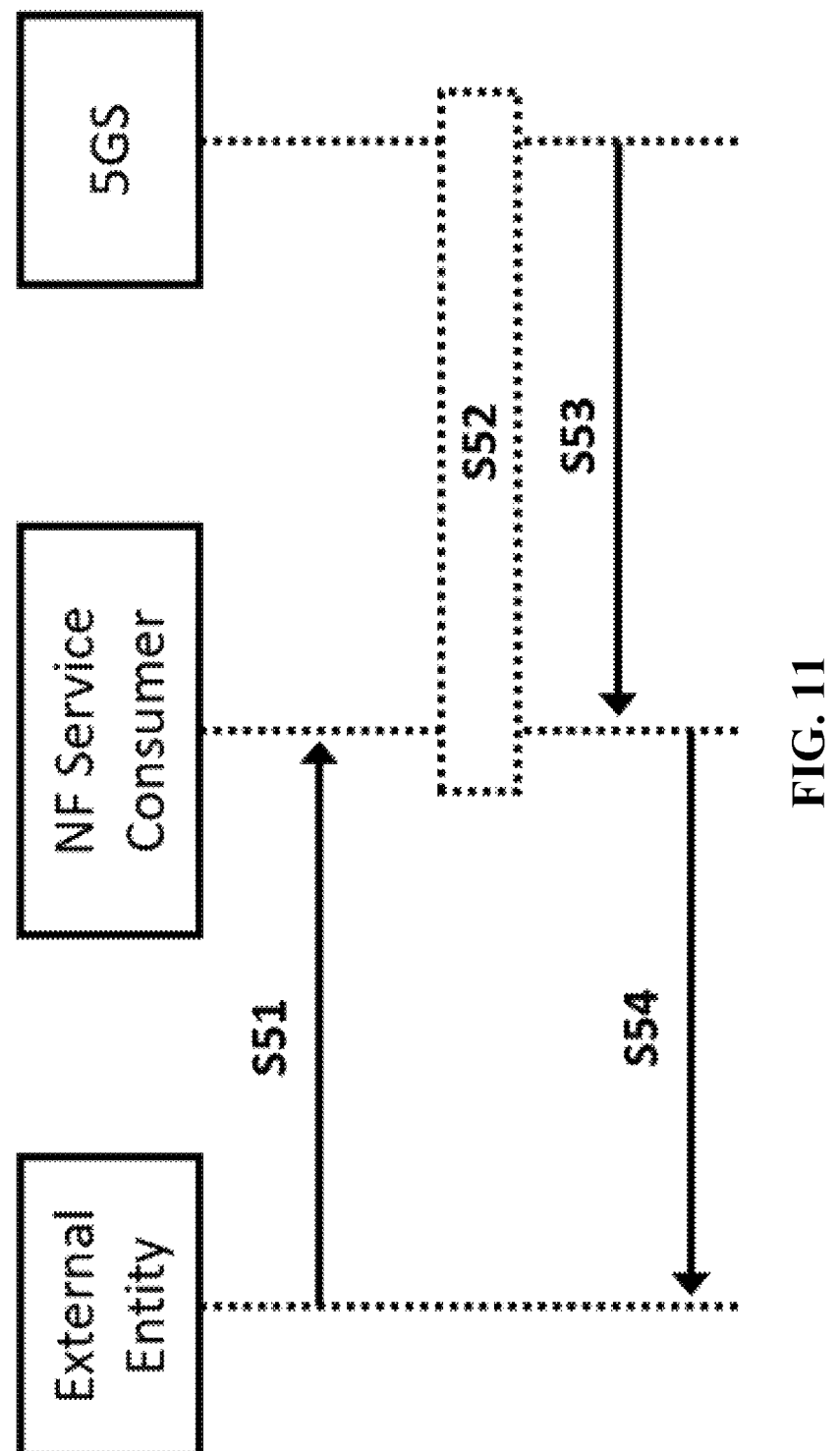
FIG. 11 illustrates a flow for application of event notification according to an embodiment of the invention.

The application of the above described methods, enables a functional entity exposing such capability, such as for example a NEF, to apply a method for application of information retrieval and a method for application of event notification, as shown in FIGS. 10 and 11, respectively, according to two exemplary embodiments.

In FIG. 10 and FIG. 11, a communication system comprises an external entity (such as a third party), a functional entity for applying the method of FIG. 8 or FIG. 9, respectively, and a 5G System.

In FIG. 10, at step S41, the external entity requests information for a given address range (IP, MAC), DNN, SUPI, GPSI, S-NSSAI, and IP domain without having knowledge of 5GS subscriber identifiers.

In step S42, the functional entity applies the method of FIG. 8 for requesting and retrieving the necessary information from the 5GS.

In step S43, the external entity receives the requested information.

In FIG. 11, at step S51, the external entity subscribes to events for a given IP address range, DNN, SUPI, GPSI, S-NSSAI, and/or IP domain, so that the external entity can receive events regarding changes for a given address range, DNN, SUPI, GPSI, S-NSSAI, and/or IP domain without having knowledge of 5GS subscriber identifiers.

In step S52, the functional entity applies the described method of FIG. 9 for subscribing to the necessary information from the 5GS.

In step S53, the 5GS notifies of events to the functional entity.

In step S54, the functional entity generates an event notification towards the external entity.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for subscribing for Policy Control Function (PCF) binding events for an address range in a 5G system (5GS), wherein the 5GS comprises a Network Function (NF) Service Consumer and a functional entity, wherein the functional entity comprises binding information stored therein and the binding information comprises: Protocol Data Unit (PDU) sessions information and a list comprising one or more identities (IDs), wherein the one or more IDs comprise one or more subscriber IDs and/or PCF instance IDs, the method comprising:

subscribing, by the NF Service Consumer, to the functional entity for binding information changes for one or more subscriber parameters, wherein the one or more subscriber parameters comprise: a Media Access Control (MAC) or Internet Protocol (IP) address range, a Data Network Name (DNN), a Subscription Permanent Identifier (SUPI), a Generic Public Subscription Identifier (GPSI), a Single Network Slice Selection Identifier (S-NSSAI), and/or an IP domain;

sending, from the functional entity to the NF Service Consumer, a confirmation of the subscription;

detecting, by the functional entity, a change of the stored binding information matching one or more subscriber parameters for one or more of the one or more IDs;

notifying, by the functional entity, the NF Service Consumer of the change of the stored binding information by sending new PDU session binding information associated with the one or more IDs; and receiving, at the NF Service Consumer, the new PDU session binding information associated with the one or more IDs.

2. The method of claim 1, wherein the 5GS further comprises a Unified data management (UDM), a Session Management Function (SMF), and a PCF, and wherein the method further comprises:

querying, by the NF Service Consumer, UDM for SMF registration data based on the one or more IDs associated with the new PDU session binding information;

replying, by the UDM to the NF Service Consumer, to the query with SMF registration data matching the one or more IDs, wherein the SMF registration data comprises one or more PDU session IDs and/or SMF instance IDs;

updating, at the NF Service Consumer, the SMF registration data; and interacting, by the NF Service Consumer, with the SMF and/or the PCF using the one or more PDU session IDs and/or SMF instance IDs.

3. The method of claim 1, further comprising:

subscribing, by an external entity, to the NF Service Consumer for event changes for information matching one or more subscriber parameters, wherein query parameters comprise: the MAC or IP address range, the DNN, the SUPI, the GPSI, the S-NSSAI, and/or the IP domain;

notifying, by the 5G system, the NF Service Consumer of event changes for the one or more subscriber parameters; and notifying, by the NF Service Consumer, the subscribed external entity of the event changes for the one or more subscriber parameters.

4. The method of claim 1, wherein:

the functional entity is a Binding Support Function (BSF); and/or the NF Service Consumer is a Network Exposure Function (NEF) or a Network Data Analytics Function (NWDAF).

5. One or more non-transitory computer-readable mediums having processor-executable instructions stored thereon for subscribing for Policy Control Function (PCF) binding events for an address range in a 5G system (5GS), wherein the 5GS comprises a Network Function (NF) Service Consumer and a functional entity, wherein the functional entity comprises binding information stored therein and the binding information comprises: Protocol Data Unit (PDU) sessions information and a list comprising one or more identities (IDs), wherein the one or more IDs comprise one or more subscriber IDs and/or PCF instance IDs, and wherein the processor-executable instructions, when executed, facilitate performance of the following:

subscribing, by the NF Service Consumer, to the functional entity for binding information changes for one or more subscriber parameters, wherein the one or more subscriber parameters comprise: a Media Access Control (MAC) or Internet Protocol (IP) address range, a Data Network Name (DNN), a Subscription Permanent Identifier (SUPI), a Generic Public Subscription Identifier (GPSI), a Single Network Slice Selection Identifier (S-NSSAI), and/or an IP domain;

sending, from the functional entity to the NF Service Consumer, a confirmation of the subscription;

detecting, by the functional entity, a change of the stored binding information matching one or more subscriber parameters for one or more of the one or more IDs;

notifying, by the functional entity, the NF Service Consumer of the change of the stored binding information by sending new PDU session binding information associated with the one or more IDs; and receiving, at the NF Service Consumer, the new PDU session binding information associated with the one or more IDs.

6. The one or more non-transitory computer-readable mediums of claim 5, wherein the 5GS further comprises a Unified data management (UDM), a Session Management Function (SMF), and a PCF, and wherein the processor-executable instructions, when executed, further facilitate performance of the following:

querying, by the NF Service Consumer, UDM for SMF registration data based on the one or more IDs associated with the new PDU session binding information;

replying, by the UDM to the NF Service Consumer, to the query with SMF registration data matching the one or more IDs, wherein the SMF registration data comprises one or more PDU session IDs and/or SMF instance IDs;

updating, at the NF Service Consumer, the SMF registration data; and interacting, by the NF Service Consumer, with the SMF and/or the PCF using the one or more PDU session IDs and/or SMF instance IDs.

7. The one or more non-transitory computer-readable mediums of claim 5, wherein the processor-executable instructions, when executed, further facilitate performance of the following:

subscribing, by an external entity, to the NF Service Consumer for event changes for information matching one or more subscriber parameters, wherein query parameters comprise: the MAC or IP address range, the DNN, the SUPI, the GPSI, the S-NSSAI, and/or the IP domain;

notifying, by the 5G system, the NF Service Consumer of event changes for the one or more subscriber parameters; and notifying, by the NF Service Consumer, the subscribed external entity of the event changes for the one or more subscriber parameters.

8. The one or more non-transitory computer-readable mediums of claim 5, wherein:

the functional entity is a Binding Support Function (BSF); and/or the NF Service Consumer is a Network Exposure Function (NEF) or a Network Data Analytics Function (NWDAF).

9. A 5G system (5GS), comprising:

one or more processors; and one or more memories having processor-executable instructions stored thereon for subscribing for Policy Control Function (PCF) binding events for an address range in the 5GS, wherein the 5GS comprises a Network Function (NF) Service Consumer and a functional entity, wherein the functional entity comprises binding information stored therein and the binding information comprises: Protocol Data Unit (PDU) sessions information and a list comprising one or more identities (IDs), wherein the one or more IDs comprise one or more subscriber IDs and/or PCF instance IDs, and wherein the processor-executable instructions, when executed by the one or more processors, facilitate performance of the following:

subscribing, by the NF Service Consumer, to the functional entity for binding information changes for one or more subscriber parameters, wherein the one or more subscriber parameters comprise: a Media Access Control (MAC) or Internet Protocol (IP) address range, a Data Network Name (DNN), a Subscription Permanent Identifier (SUPI), a Generic Public Subscription Identifier (GPSI), a Single Network Slice Selection Identifier (S-NSSAI), and/or an IP domain;

sending, from the functional entity to the NF Service Consumer, a confirmation of the subscription;

detecting, by the functional entity, a change of the stored binding information matching one or more subscriber parameters for one or more of the one or more IDs;

notifying, by the functional entity, the NF Service Consumer of the change of the stored binding information by sending new PDU session binding information associated with the one or more IDs; and receiving, at the NF Service Consumer, the new PDU session binding information associated with the one or more IDs.

10. The 5GS of claim 9, wherein the 5GS further comprises a Unified data management (UDM), a Session Management Function (SMF), and a PCF, and wherein the processor-executable instructions, when executed by the one or more processors, facilitate performance of the following:

querying, by the NF Service Consumer, UDM for SMF registration data based on the one or more IDs associated with the new PDU session binding information;

replying, by the UDM to the NF Service Consumer, to the query with SMF registration data matching the one or more IDs, wherein the SMF registration data comprises one or more PDU session IDs and/or SMF instance IDs;

updating, at the NF Service Consumer, the SMF registration data; and interacting, by the NF Service Consumer, with the SMF and/or the PCF using the one or more PDU session IDs and/or SMF instance IDs.

11. The 5GS of claim 9, wherein the processor-executable instructions, when executed by the one or more processors, facilitate performance of the following:

subscribing, by an external entity, to the NF Service Consumer for event changes for information matching one or more subscriber parameters, wherein query parameters comprise: the MAC or IP address range, the DNN, the SUPI, the GPSI, the S-NSSAI, and/or the IP domain;

notifying, by the 5G system, the NF Service Consumer of event changes for the one or more subscriber parameters; and notifying, by the NF Service Consumer, the subscribed external entity of the event changes for the one or more subscriber parameters.

12. The 5GS of claim 9, wherein the processor-executable instructions, wherein:

the functional entity is a Binding Support Function (BSF); and/or the NF Service Consumer is a Network Exposure Function (NEF) or a Network Data Analytics Function (NWDAF).

* * * * *